United States Patent [19]
Roller et al.

[11] 4,343,988
[45] Aug. 10, 1982

[54] ELECTRICAL RESISTANCE WATER HEATING DEVICE, PARTICULARLY FOR BEVERAGE PREPARATION MACHINES

[75] Inventors: Hanno Roller; Helmut Ohnmacht, both of Kandel; Ludwig Lieber, Steinweiler; Karl-Heinz Nauerth, Erlenbach, all of Fed. Rep. of Germany

[73] Assignee: Firma Fritz Eichenauer, Kandel, Fed. Rep. of Germany

[21] Appl. No.: 3,917

[22] Filed: Jan. 16, 1979

[30] Foreign Application Priority Data

Feb. 4, 1978 [DE] Fed. Rep. of Germany ....... 2804784

[51] Int. Cl.$^3$ .......................... H05B 3/02; F24H 1/12; A47J 31/44
[52] U.S. Cl. ..................................... 219/302; 99/288; 165/165; 165/168; 219/283; 219/298; 219/305; 219/530
[58] Field of Search ...................... 219/283, 296–305, 219/308, 309, 530, 540; 165/164, 165, 168, 171; 99/288

[56] References Cited

U.S. PATENT DOCUMENTS

| | | | |
|---|---|---|---|
| 808,525 | 12/1905 | Erie | 219/301 |
| 941,215 | 11/1909 | Wade | 219/303 |
| 1,820,458 | 8/1931 | Jenkins | 219/301 |
| 1,978,690 | 10/1934 | Peterson | 219/301 X |
| 2,920,377 | 1/1960 | Janos | 219/301 |
| 3,338,476 | 8/1967 | Marcoux | 219/300 X |

FOREIGN PATENT DOCUMENTS

| | | | |
|---|---|---|---|
| 2316539 | 10/1973 | Fed. Rep. of Germany | 219/302 |
| 2340489 | 2/1975 | Fed. Rep. of Germany | 219/302 |
| 2429804 | 3/1975 | Fed. Rep. of Germany | 219/302 |
| 2537769 | 3/1977 | Fed. Rep. of Germany | 219/283 |
| 2226138 | 11/1974 | France | 219/283 |

*Primary Examiner*—A. Bartis
*Attorney, Agent, or Firm*—Craig & Antonelli

[57] ABSTRACT

An electrical resistance water heating device, particularly intended for use in coffee or other beverage preparation machines, includes a solid metal heating plate having planar upper and lower surfaces. A fluid throughflow duct is formed between the upper and lower surfaces and includes at least two elongated, spaced, side-by-side branches having corresponding ends interconnected by a connecting conduit to form a continuous fluid flow path from a water inlet to a water outlet. An elongated slot is formed between each pair of side-by-side branches and at least one plate-shaped planar PTC heating element is accomodated within each elongated slot with each of the opposing surfaces thereof directed toward a respective one of the pair of side-by-side branches between which the duct is formed. The spaces between the heating element and walls of the slot are filled with a hardenable electrically insulative filling of good heat conductivity.

11 Claims, 8 Drawing Figures

PTC HEATING ELEMENT

METALLIZATION

ELECTRICAL RESISTANCE WATER HEATING DEVICE, PARTICULARLY FOR BEVERAGE PREPARATION MACHINES

The invention relates to an electrical resistance heating device of the kind having at least one heating element and having a water throughflow duct, the heating element or elements and the water throughflow duct being in thermally conductive communication. More particularly, although not exclusively, the invention is concerned with electrical resistance-heating devices of this construction such as are used for beverage preparation machines such as coffee-making machines or the like. In such cases the cold water, contained in a vessel situated above the level of the heating device, enters by way of an inlet conduit into the water throughflow duct, is heated therein and is conducted for example on to the ground coffee provided in a filter. Usually, this receptacle is placed on a stand which is in thermally conductive communication with the heating device and thus keeps the coffee beverage warm.

In electrical resistance heating devices of the above-specified kind which are known (in practical use) the heating element comprises an electrical tubular heating body which is soldered or welded to the water throughflow duct, the latter being a metal tube or pipe, to make the heat-conducting connection. Usually a temperature regulator is also provided, which interrupts the supply of electrical current when the water supply has been used up. Additionally there is provided a device for protecting against overheating, in the form of a temperature-responsive safety fuse, in order to prevent destruction of the plastics material housing by overheating in the event of running dry.

In this known constructional form a thermal efficiency is achieved which is not yet completely satisfactory, and more particularly, the transfer of heat between the heating element and the water throughflow duct is capable of improvement. Furthermore, these known electrical resistance heating elements are relatively expensive as regards production and fitting in the apparatus in which they are to be used.

An object of the present invention is to provide an electrical resistance heating device, of the kind initially specified herein, which affords improved thermal efficiency and allows simple, inexpensive manufacture and assembly.

According to the present invention there is provided an electrical resistance heating device having at least one heating element and having a water throughflow duct, which heating element and duct are in heat-conducting communication, said device comprising a heating plate which is formed to define said duct and to define a slot in which said element is accommodated. In this way the result is achieved that both the water throughflow duct and the heating element or elements are situated in a more-or-less solid slab-like heating plate and are consequently in optimum thermal contact. At the same time the heating plate can easily be so arranged that it can be prefabricated to such an extent in an inexpensive manner by casting, extrusion or the like that only a few inexpensive finishing operations are required. Because of the construction as a more-or-less solid plate-shaped part, fitting-in the apparatus concerned is extremely simple, and at the same time the heating plate can be so constructed and arranged that it itself forms the heat-dispensing stand or supporting surface for a coffee pot or the like, so that there is no need to provide an additional plate for the coffee pot to stand on.

Within the framework of the invention, it is possible in principle to use heating elements of many different types including, for example, heating elements of the hitherto conventional and widely used type having a metal resistance conductor. More particularly, however, the invention proposes that the heating element or elements should comprise a material with a positive temperature-coefficient of electrical resistance (PTC material). Such PTC heating elements are known per se (cf. German laid-open Pat. No. 25 04 237), generally comprises a ceramic material, more particularly having a barium titanate base, and have the property of being more-or-less self-stabilizing as regards their electrical power consumption. In the cold state their resistance is low; consequently, with a given electrical voltage, a relatively high current flows. As a result, it is only a short time before the operating temperature is reached with a given operating resistance. If for any reasons the temperature of the PTC heating element increases above the specified temperature the resistance increases further so that the converted electrical power is reduced. Consequently, when using PTC heating elements it is possible to dispense with temperature regulators and devices for protection against overheating. The use of such PTC heating elements, however, it not straightfowardly possible. On the one hand, the usual fitting and assembly measures cannot be used with PTC heating elements since these are usually available in the form of relatively small, usually plane parallel plates. On the other hand, when using PTC elements very special care must be taken to achieve a perfect thermal contact. For the arrangement according to the invention as discussed hereinbefore it is of particular importance that it allows the use of PTC heating elements in electrical resistance heating devices of the kind specified initially herein.

In more detail, the arrangement is preferably made such that the heating elements, formed as plane parallel plates, are arranged so that a perpendicular to their surface is directed towards the water throughflow duct; in other words, the surface of the element faces towards the duct. This implies that the element-accommodating slots, which will usually be given a rectangular cross-section corresponding to the cross-section of the heating elements, will also be appropriately orientated with their walls to the water throughflow duct. Electrical insulation of the PTC heating elements from the heating plate will usually be necessary, and, by way of example, thin strips of insulating ceramic material (for example, aluminum oxide) can be used. In addition to provision of electrical insulation, heat exchange can be improved if the accommodation slots are filled with an electrically insulating filling with good heat-conducting properties, for example, silicone rubber or a synthetic resin having a polyamide or polyimide base, or heat-conducting ceramic material, such as compressed aluminum oxide powder.

It is advisable to construct the water throughflow duct with at least two branches or meanders parallel to one another and aluminum connected by a reverse bend, and to arrange the heating elements are arranged at least in the region between the branches, so that optimum utilization of heat results. Preferably, the water throughflow duct is in the shape of a flat sinuous coil with a plurality of branches or meanders which are parallel to one another and are connected by reverse bends, the heating elements being arranged with their plane at right-angles to the sinuous coil plane and at least between the branches, so that structures of a relatively considerable extent with uniform dispensing of heat can be achieved.

There are various possible ways of constructing the water throughflow duct. For example, the water throughflow duct can be cast in the heating plate in the form of a closed duct. If this presents difficulties from the casting point of view, it is advisable to make the water throughflow duct extend into the heating plate from one side, and to close it by a cover plate which is applied in a sealed manner onto the said side, for example, by means of an adhesive material. The water throughflow duct may be produced by milling cutters or by casting, for example. The use of profile material, having a particular cross-sectional shape along its length—produced for example by casting or extrusion—which is particularly advantageous since it is inexpensive, is made possible by arranging that the heating plate consists of at least one profile material section, the water throughflow duct being pre-formed in the cross-section of the profile material and closed by cover plates applied in a sealed manner on both sides of the heating plate. The longitudinal extent of the profile material extends at least substantially at right-angles to the plane in which the water throughflow duct runs. It is possible to use two inter-engaging open profiles, which can be orientated relatively to one another if necessary by means of adjusting projections shoulders or stops, with the inter-engaging contours defining the water throughflow duct; alternatively, it is possible to use a single closed profile, in which case it is necessary to obtain access to the water throughflow duct by suitable bores. In each case, one or two cover plates are provided which close the water throughflow duct and at the same time serve as a supporting surface for a coffee pot or the like placed on the heating plate.

The slots for accommodating the heating elements can also be formed in the plate by casting or by simple saw cuts, and of course care must always be taken to ensure that the slots do not cut into the water throughflow duct. Preferably the arrangement is made such that the slots penetrate from at least one end of the heating plate like fingers in between the branches of the water throughflow duct and do not pass completely through the heating plate. In other words, the slots are preferably closed at one side so that assembly of the heating elements, and sealing-in if necessary, can be carried out in a simple manner. If cover plates are provided, these can preferably cover the slots at the same time.

Inlet and outlet connections to the water throughflow duct can be achieved in a particularly simple manner if connecting pipes or stubs (for example in the form of hose nipples or the like), associated with the mouths of the water throughflow duct, are glued or cemented on to the end or ends of the heating plates. Depending on the fitting circumstances it is also possible to arrange the connecting pipes perpendicularly to the plane of the water throughflow duct, for example in the cover plate.

As already mentioned above, it is advisable to fill or cast-in the slots after insertion of the heating elements. Normaly, it is necessary to adjust the heating elements in a relatively precise manner so that electrical connection with the heating plate is reliably prevented even when there is only a small clearance between the heating element and the wall of the slot. This adjustment is carried out in a particularly advantageous manner by fixing the heating elements, before casting-in, by means of fixing pins arranged at the two sides between heating element and slot wall. This is described in more detail in U.S. patent application Ser. No. 003,896 by the present applicants, which application is being filed simultaneously herewith and the content of which is hereby expressly incorporated herein as part of the disclosure content of the present patent application.

The invention will be more fully explained hereinafter with reference to the accompanying drawings in which, by way of example:

Figure 1:
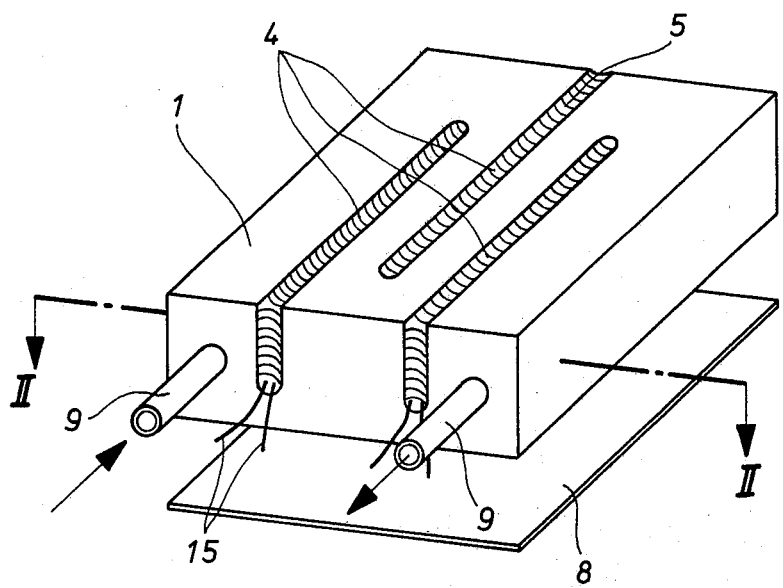
FIG. 1 shows an electrical resistance heating device in perspective view.

The electrical resistance heating device shown in FIG. 1 may be used in a coffee-making machine, on the one hand, as a continuous throughflow heater for the coffee water and, on the other hand, as a heating plate for a pot (not shown here) receiving the made coffee. The heating device comprises basically a plate-shaped solid part forming a heating plate 1. A water throughflow duct 2 (see FIG. 3) is formed in the heating plate 1, and also a plurality of heating elements 3 are inserted therein, these consisting in all the illustrated constructional examples of PTC material with a barium titanate ceramic base. The heating elements 3 are accommodated in slots 4 which are also formed in the heating plate 1. Consequently, the heating elements 3 and the water throughflow duct 2 are in thermally conductive communication with one another.

Figure 2:
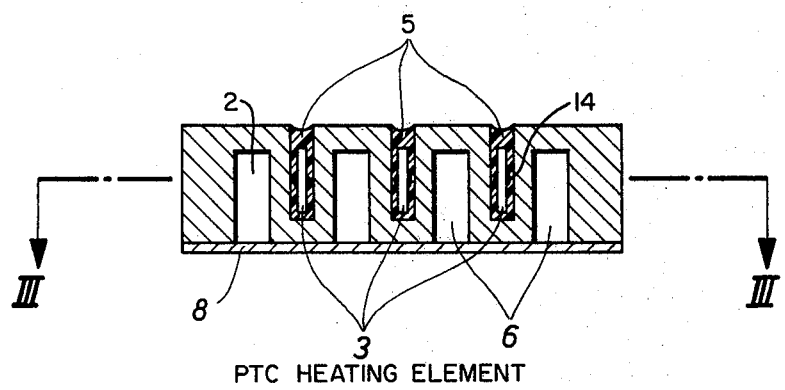
FIG. 2 shows the subject of FIG. 1 in a section on line II—II.

The cross-section shown in FIG. 2 shows how the heating elements 3, which are constructed as plane parallel plates, are arranged so that a perpendicular to their face is directed towards the water throughflow duct 2; in other words, the elements are so disposed that their major surfaces face towards the duct 2. In order to achieve the best possible thermal contact, it is advisable to adapt the cross-section of the slots 4 to the cross-section of the heating elements 3 so that there is relatively little spare space. The drawings also show that the slots 4 do not extend right through the heating plate 1, but are closed at one side.

Figure 3:
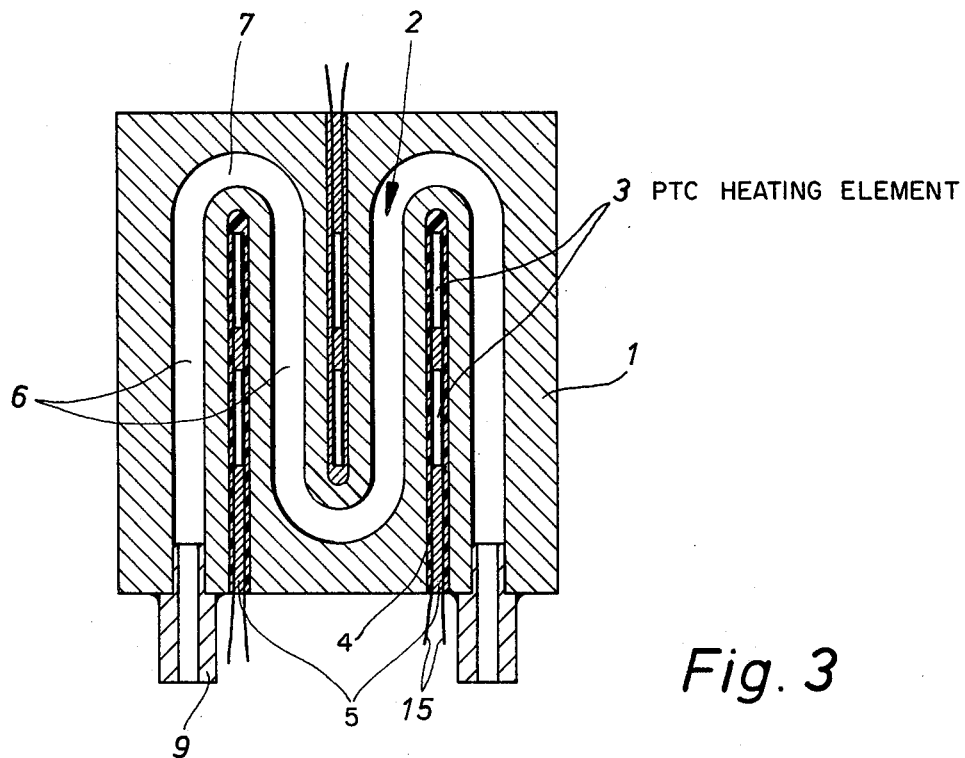
FIG. 3 shows the subject of FIG. 2 in a section on line III—III.

As FIG. 3 shows more particularly, the water throughflow duct 2 comprises a plurality of branches or meanders 6 which are parallel to one another, are situated in a single plane, and are connected by reverse bends 7 to form a sinuous coil. The element-accommodation slots 4 extend from the two ends of the heating plate 1 in the manner of fingers in between the branches 6 of the water throughflow duct 2, the slots 4 being given appropriate uniform spacings from one another and from the branches 6 of the water throughflow duct 2. In the illustrated constructional example, such slots 4 are provided only between the branches 6. It is also possible, although not shown in the drawings, to provide additionally, at the outer sides of the heating plate 1, further heating elements even though the thermal efficiency thereof may be less favorable. Likewise it is not shown that, if necessary, for insulation of the heating elements 3, intermediate layers of electrically insulating material 5 with good heat-conducting properties can additionally be interposed between the heating elements 3 and the walls of the slots 4. This heating plate 1 may conveniently be produced as a casting from aluminum or an aluminum alloy.

In the constructional example shown in FIGS. 1 to 3 the water throughflow duct 2 is created as a recess in the heating plate 1 from one side or major surface, this being the side opposite to the slots 4. This can be achieved for example by casting or possibly by the use of milling cutters. The water throughflow duct 2, which at first is open at one side, is closed by a cover plate 8 which is secured in a sealed manner, conveniently by means of a suitable adhesive, on the corresponding side of the heating plate 1. At one of the ends of the heating plate 1, connecting pipes 9 in the form of simple aluminum tubes are cemented into the mouths of the duct 2. The heating plate 1 itself consists preferably of a metal which is a good conductor of heat, such as aluminum or an aluminum alloy, as mentioned above.

Figure 4:
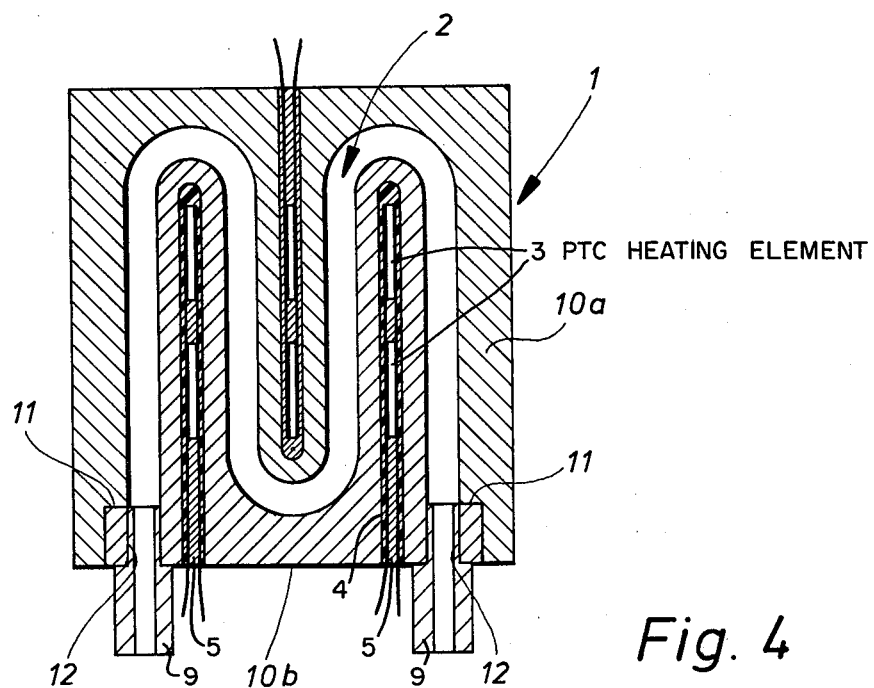
FIG. 4 shows another constructional form in a section corresponding to FIG. 3.
Figure 6:
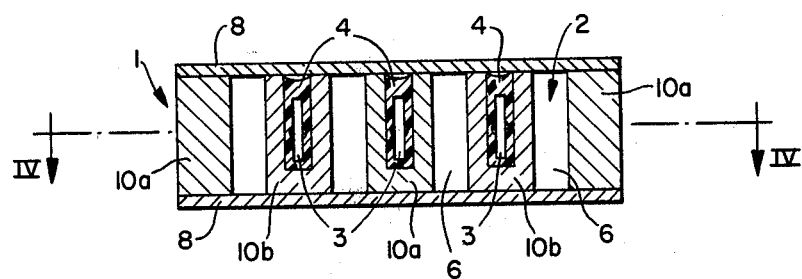
FIG. 6 is a sectional view of the FIG. 4 embodiment.

Another constructional possiblity is shown in FIG. 4. Here, the heating plate 1 comprises two profile material sections 10a, 10b which are inserted into one another and whose contours facing towards one another define the water throughflow duct 2. The two profile material sections comprise adjusting projections or shoulders 11 which cooperate with one another so that reproducible assembly is possible in a simple manner. The appropriate profile materials can be produced in a simple manner by casting or extrusion and production of the heating plate 1 is extremely simple since it is only necessary to cut the profile material sections 10a, 10b to length, place them in one another and connect them together, for example by the use of an adhesive. The cross-section formed by the two sections of profile material 10a, 10b can alternatively be achieved by a single, closed profile. The connection of the water throughflow duct 2 is effected with bores 12 which are arranged in one of the ends and into which connecting pipes 9 are cemented.

Figure 5:
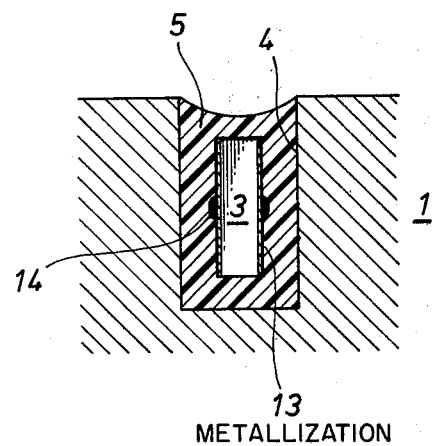
FIG. 5 shows on a larger scale a cross-section through a slot accommodating a heating element.

FIG. 5 shows on a larger scale a cross-section through a slot 4 which is sealed by being cast-in or filled with silicone rubber 5 after the heating element 3 has been inserted. Also shown is the way in which the heating element 3 comprising PTC material has a surface metallization 13 to which the electrical leads 15 are connected by solder points 14.

Figure 7:
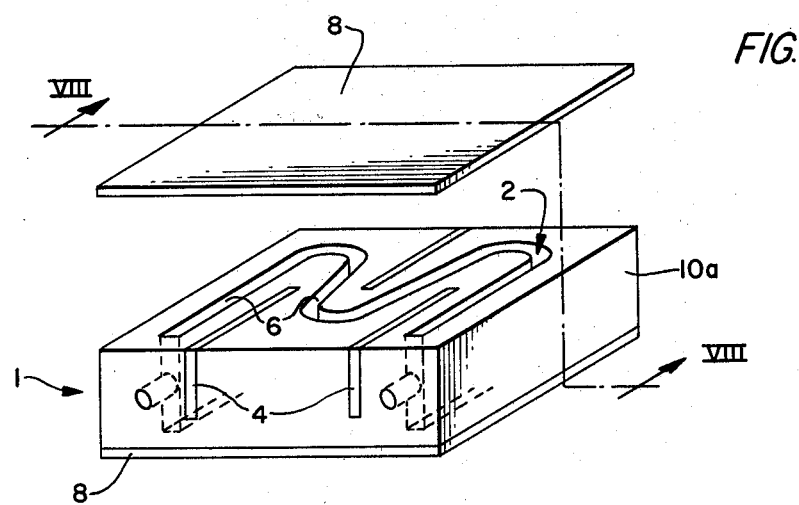
FIG. 7 is a partially exploded view of a further embodiment.
Figure 8:
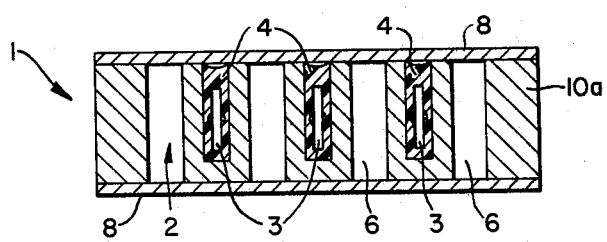
FIG. 8 is a sectional view taken along line IIX—IIX of FIG. 7.

As can be seen with reference to FIGS. 7 and 8, it is possible in accordance with the present invention for the water throughflow duct 2 to be pre-formed in the cross-section of the profile material 10a and closed by cover plates applied in a sealed manner on both sides of the heating plate 1.

What is claimed is:

1. An electrical resistance heating device suitable for use in a hot-plate or the like comprising a solid metal heating plate having a plate-shaped body and planar upper and lower surfaces, and a fluid throughflow duct formed therein between said upper and lower surfaces, said duct including at least two elongated, spaced side-by-side branches having corresponding ends interconnected by a connecting conduit to form a continuous fluid flow path in a single plane from a fluid inlet to a fluid outlet of said body, an elongated slot being formed in said plate between each pair of side-by-side branches, and at least one plate-shaped planar heating element being accommodated within each respective elongated slot with each of the opposing major surfaces thereof directed toward a respective one of the pair of side-by-side branches of said duct between which the slot is formed.

2. An electrical resistance-heating device according to claim 1, in which said at least one heating element in each slot comprises a material having a positive temperature-coefficient of electrical resistance.

3. An electrical resistance heating device according to claim 1 in which said at least one heating element in each slot is constructed as a parallelepiped plate.

4. An electrical resistance heating device according to claim 1, in which spaces between said at least one heating element and the walls of the slot are filled with a hardenable electrically insulating filling which is a good conductor of heat.

5. An electrical resistance heating device according to claim 1, in which said branches are parallel to one another and are connected by reverse bends.

6. An electrical resistance heating device according to claim 1, in which said duct is of flat meander form and said branches are parallel to one another and are connected by reverse bends, and said at least one heating element disposed in each slot is arranged with said major surfaces of each said heating element in planes perpendicular to the meander plane of the duct.

7. An electrical resistance heating device according to claim 1, in which said duct is created as a recess in the heating plate from one of the upper or lower surfaces thereof, said recess being closed by a cover plate which is applied in a sealed manner on to said one side of said plate.

8. An electrical resistance heating device according to claim 1 in which the heating plate consists of at least one profile material section and the water throughflow duct is pre-formed in the cross-section of the profile material section and is closed by a cover plate applied in a sealed manner on both sides of the heating plate.

9. An electrical resistance heating device according to claim 1, in which each of said slots enters finger-like from a least one end of said plate in between two side-by-side branches of said duct.

10. An electrical resistance-heating device according to claim 1, in which each slot extends only partially through the heating plate.

11. An electrical resistance heating device according to claim 1, wherein connecting pipes associated with the inlet and outlet of the fluid duct are secured to the heating plate.

* * * * *